US012674960B2

(12) United States Patent　　　　(10) Patent No.:　US 12,674,960 B2
Noh et al.　　　　　　　　　　　　(45) Date of Patent:　　　Jul. 7, 2026

(54) SMALL LENS SYSTEM

(71) Applicant: SEKONIX CO., LTD., Gyeonggi-do (KR)

(72) Inventors: Ki Youn Noh, Gyeonggi-do (KR); Seong Jun Bae, Gyeonggi-do (KR); Chae Yeong Kim, Gyeonggi-do (KR); Ji Young Choi, Gyeonggi-do (KR); In Jeong Hwang, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 282 days.

(21) Appl. No.: 18/516,739

(22) Filed: Nov. 21, 2023

(65) Prior Publication Data

US 2024/0184081 A1　　Jun. 6, 2024

(30) Foreign Application Priority Data

Dec. 1, 2022　(KR) ......................... 10-2022-0165559

(51) Int. Cl.
　G02B 9/58　　　　(2006.01)
　G02B 13/00　　　(2006.01)
(52) U.S. Cl.
　CPC ............. G02B 9/58 (2013.01); G02B 13/004 (2013.01)

(58) Field of Classification Search
　CPC ................................. G02B 9/58; G02B 13/004
　USPC .......................................................... 359/782
　See application file for complete search history.

(56) References Cited

U.S. PATENT DOCUMENTS

2020/0310082 A1* 10/2020 Tseng ........................ G02B 9/58
2021/0325635 A1* 10/2021 Chang ....................... G02B 9/34

* cited by examiner

*Primary Examiner* — George G. King
(74) *Attorney, Agent, or Firm* — Mendelsohn Dunleavy, P.C.

(57)　　　　　　ABSTRACT

Proposed is a small lens system including a first lens, a second lens, a third lens, and a fourth lens arranged along an optical axis from an object. The iris diaphragm is located between the first lens and the second lens. The first lens has a negative refractive power and includes a surface concave surface on an object side and a convex surface on an image side. The second lens has a positive refractive power and includes convex surfaces on both sides. The third lens has a positive refractive power and includes convex surfaces on both sides. The fourth lens has a negative refractive power and includes concave surfaces on both sides. All surfaces of the first to fourth lenses are aspherical.

11 Claims, 7 Drawing Sheets

SMALL LENS SYSTEM

CROSS REFERENCE TO RELATED APPLICATION

The present application claims priority to Korean Patent Application No. 10-2022-0165559, filed Dec. 1, 2022, the entire contents of which are incorporated herein for all purposes by this reference.

BACKGROUND

Technical Field

The present disclosure relates to a small lens system including four lenses and, more particularly, to a small lens system having improved performance and sensitivity of lenses.

Description of the Related Art

Recently, with an increasing demand for high-definition, high-performance, miniaturized, and lightweight electronic devices provided with a camera function, in particular, smartphones, research for realizing such a demand by improving the performance of an ultra-small lens optical system is carried out.

In addition, as the zoom function of smartphones expands and foldable smartphones are released, the total length of a lens system is required to gradually decrease and high-resolution, compact, and lightweight technologies are increasingly required. In addition, it may be advantageous for miniaturizing cameras by reducing the size of the opening. For this purpose, it is important to reduce the size of the effective diameter of the first lens.

In particular, it may be more advantageous for small lenses mounted on smartphones when the total track length (TTL) of the lens system is shorter due to limitations in the thickness of the smartphone.

However, when the TTL is reduced in order to reduce the TTL/ImagH value, the tolerance of the lens system may be sensitive and a design error is likely to occur. Thus, a lens system for compensating for the design error is required.

In a lens system disclosed in U.S. Pat. No. 10,310,221 B2, a first lens has a negative refractive power and has concave surfaces on the object side and the image side, respectively. A third lens has a positive refractive power and has a concave surface on the object side and a convex surface on the image side. A fourth lens has a negative refractive power and has a concave surface on the object side.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a small lens system including a total of four lenses, the small lens system having high performance and improved sensitivity by providing the lenses with negative, positive, positive, and negative refractive powers, respectively, and controlling the curvature and shape of each of the lenses.

In order to achieve at least one of the above objectives, according to one aspect of the present disclosure, there is provided a small lens system including a first lens, a second lens, a third lens, and a fourth lens arranged along an optical axis from an object. The iris diaphragm may be located between the first lens and the second lens. The first lens may have a negative refractive power and includes a surface concave surface on an object side and a convex surface on an image side. The second lens may have a positive refractive power and includes convex surfaces on both sides. The third lens may have a positive refractive power and includes convex surfaces on both sides. The fourth lens may have a negative refractive power and includes concave surfaces on both sides. All surfaces of the first to fourth lenses may be aspherical.

An object side curvature R1 and an image side curvature R2 of the first lens and an object side curvature R3 and an image side curvature R4 of the second lens may satisfy $-2 < (R1+R2)/(R1-R2) < 0$ and $0 < (R3+R4)/(R3-R4) < 0.5$.

An effective focal length F of the entire system, a focal length f1 of the first lens, a focal length f2 of the second lens, a focal length f3 of the third lens, a focal length f4 of the fourth lens may satisfy $F/f1+F/f2+F/f3+F/f4 < 0.55$.

A focal length f1 of the first lens, a focal length f2 of the second lens, a focal length f4 of the fourth lens may satisfy $0 < (f1/f2)+(f1/f4) < 1$.

A refractive power P1 of the first lens, a refractive power P2 of the second lens, a refractive power P3 of the third lens, a refractive power P4 of the fourth lens may satisfy $-1 < P1-(P2+P3+P4) < 0$.

A center thickness L1_CT of the first lens, a center thickness L2_CT of the second lens, a center thickness L3_CT of the third lens, and a center thickness L4_CT of the fourth lens may satisfy $1.3 < (L3\_CT+L4\_CT)/(L2\_CT+L1\_CT) < 1.6$.

Each of the second lens and the third lens may be configured to have convex surfaces on both sides. A center thickness L2_CT and an outermost thickness L2_ET of the second lens and a center thickness L3_CT and an outermost thickness L3_ET of the third lens may satisfy $0 < L2\_CT/L2\_ET < 3.0$ and $1.0 < L3\_CT/L3\_ET < 3.0$, respectively.

A refractive index L1_Nd of the first lens and a refractive index L2_Nd of the second lens may satisfy $L2\_Nd-L1\_Nd < 0.01$.

A half field of view HFOV and an upward angle CRA of a main ray of the lens system may be set to satisfy $1 < HFOV/CRA < 1.6$.

A distance to the image side from a center of the first lens and an image side height ImageH may be set to satisfy $2.0 < TTL/ImageH < 2.5$.

According to the present disclosure, the small lens system including the first to fourth lenses arranged along the optical axis from an object is provided. The small lens system having a small size, a light weight, and a reduced tolerance may be provided by suitably designing the refractive powers and shapes of the lenses.

In addition, in the present disclosure, the color aberration is corrected by the distribution of negative, positive, positive, and negative refractive powers using a total of four lenses. Distortion is minimized and the sensitivity of tolerance is reduced by controlling the curvature and shape by configuring the first lens to have a meniscus shape concave on the object side, each of the second and third lenses to have convex surfaces on both sides, and the fourth lens to have concave surfaces on both sides. Accordingly, the lens system having superior performance and productivity is provided.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

The present disclosure relates to a lens system including a total of four lenses, in which first, second, third, and fourth lenses are arranged along the optical axis from an object. The lens system having a reduced size, a reduced weight, and a reduced tolerance may be provided by suitably designing refractive power, shape, and the like of each of the lenses.

In addition, in the present disclosure, the color aberration is corrected by the distribution of negative, positive, positive, and negative refractive powers using a total of four lenses. Distortion is minimized and the sensitivity of tolerance is reduced by controlling the curvature and shape by configuring the first lens to have a meniscus shape concave on the object side, each of the second and third lenses to have convex surfaces on both sides, and the fourth lens to have concave surfaces on both sides. Accordingly, the lens system having superior performance and productivity is provided.

Figure 1:
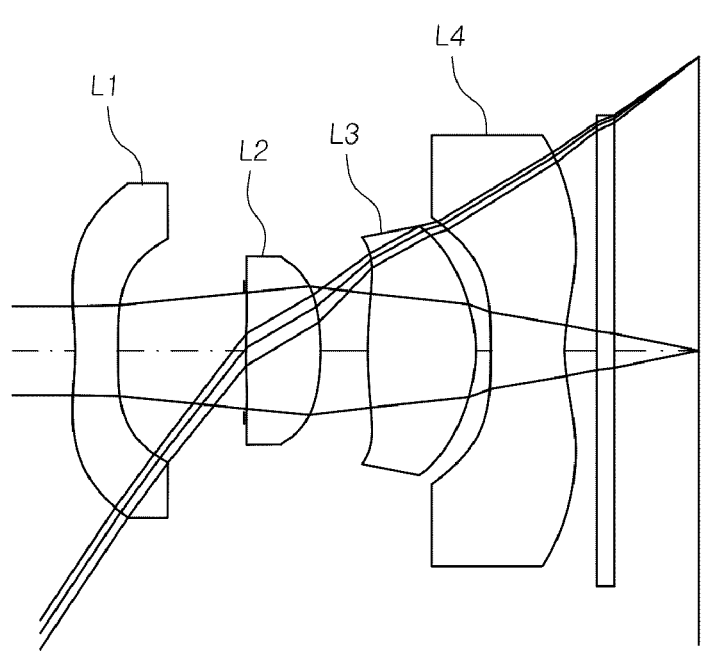
FIG. 1 is a diagram illustrating a first embodiment of a small lens system according to the present disclosure.
Figure 2:
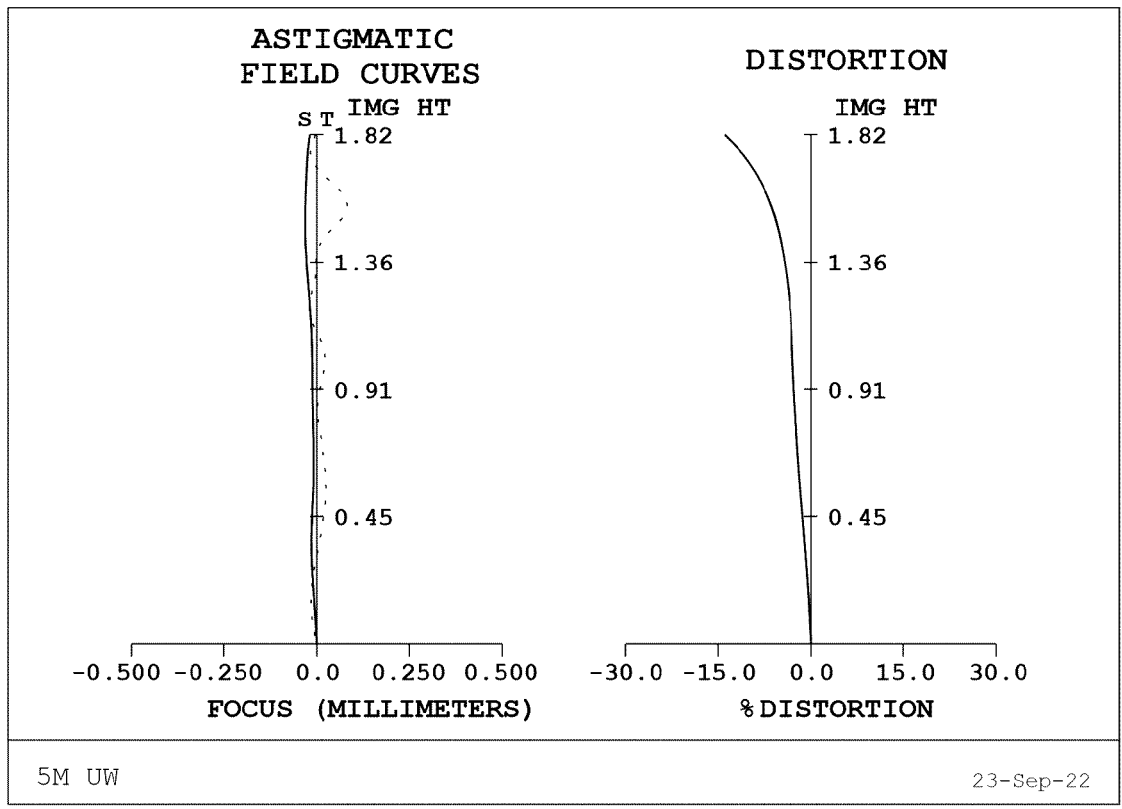
FIG. 2 is an aberration diagram according to the first embodiment of the present disclosure.
Figure 3:
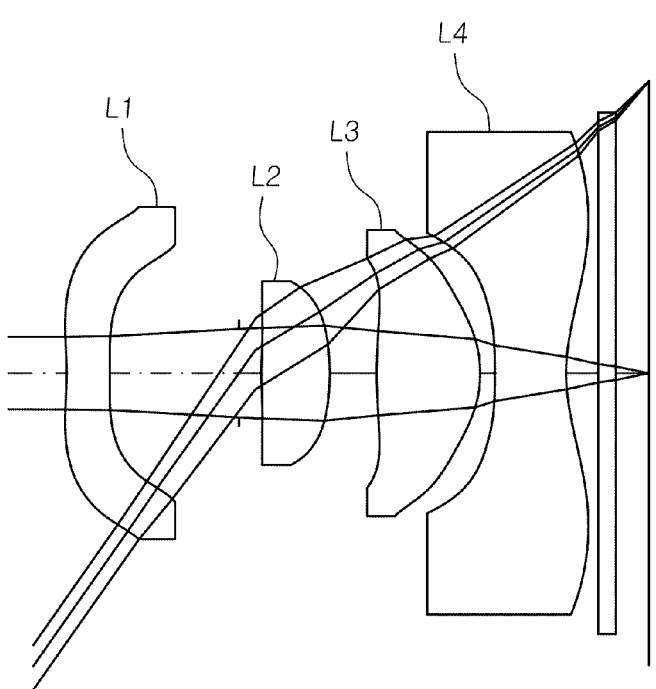
FIG. 3 is a diagram illustrating a second embodiment of the small lens system according to the present disclosure.
Figure 4:
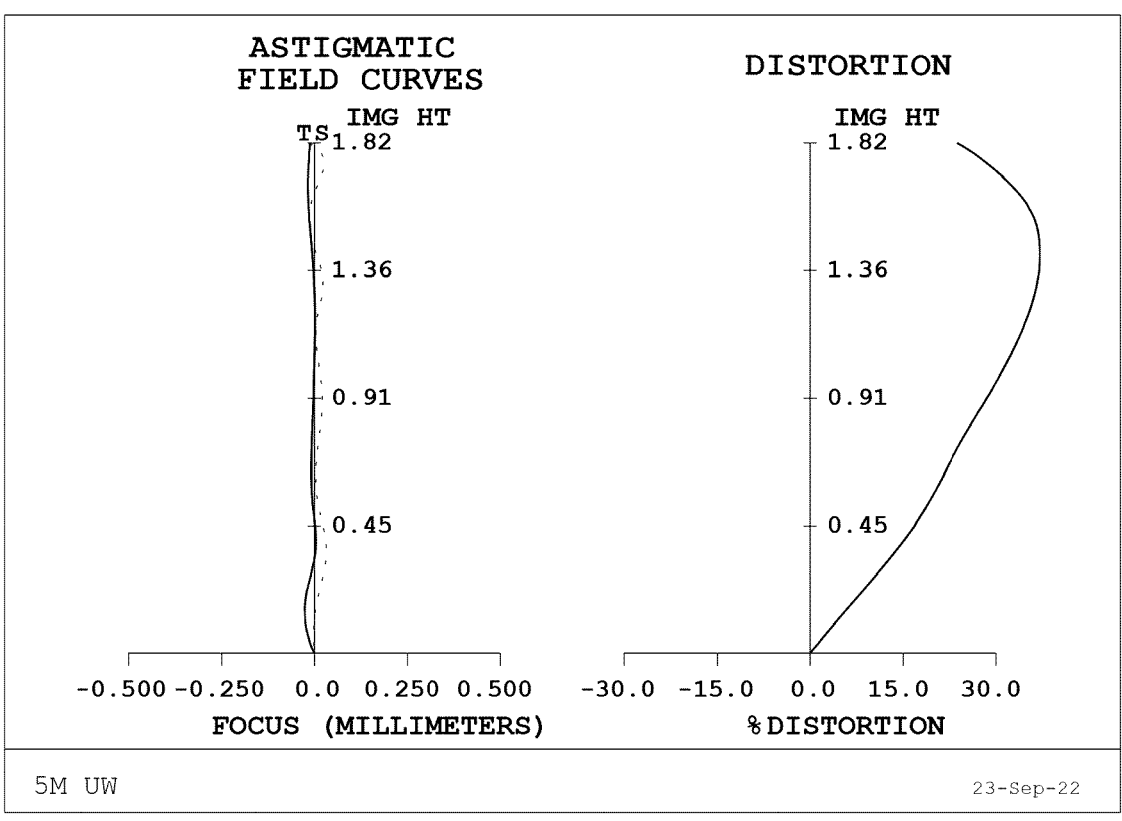
FIG. 4 is an aberration diagram according to the second embodiment of the present disclosure.
Figure 5:
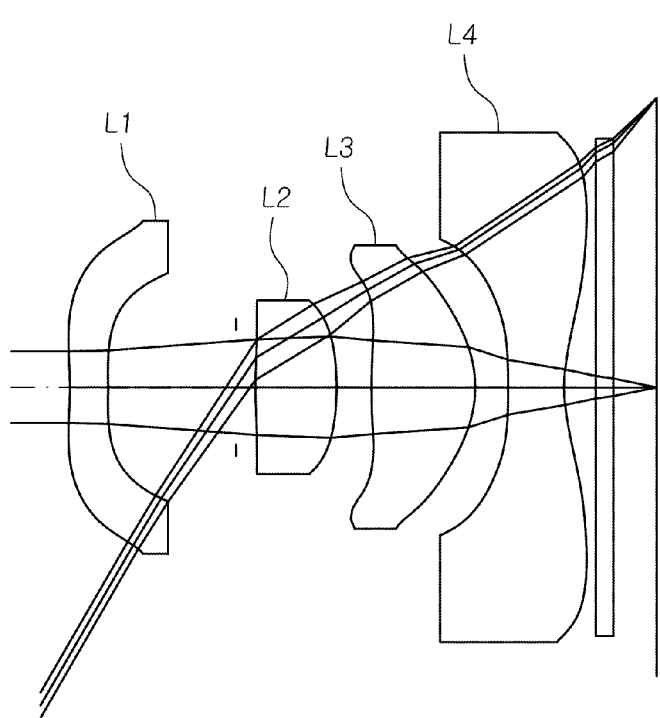
FIG. 5 is a diagram illustrating a third embodiment of the small lens system according to the present disclosure.
Figure 6:
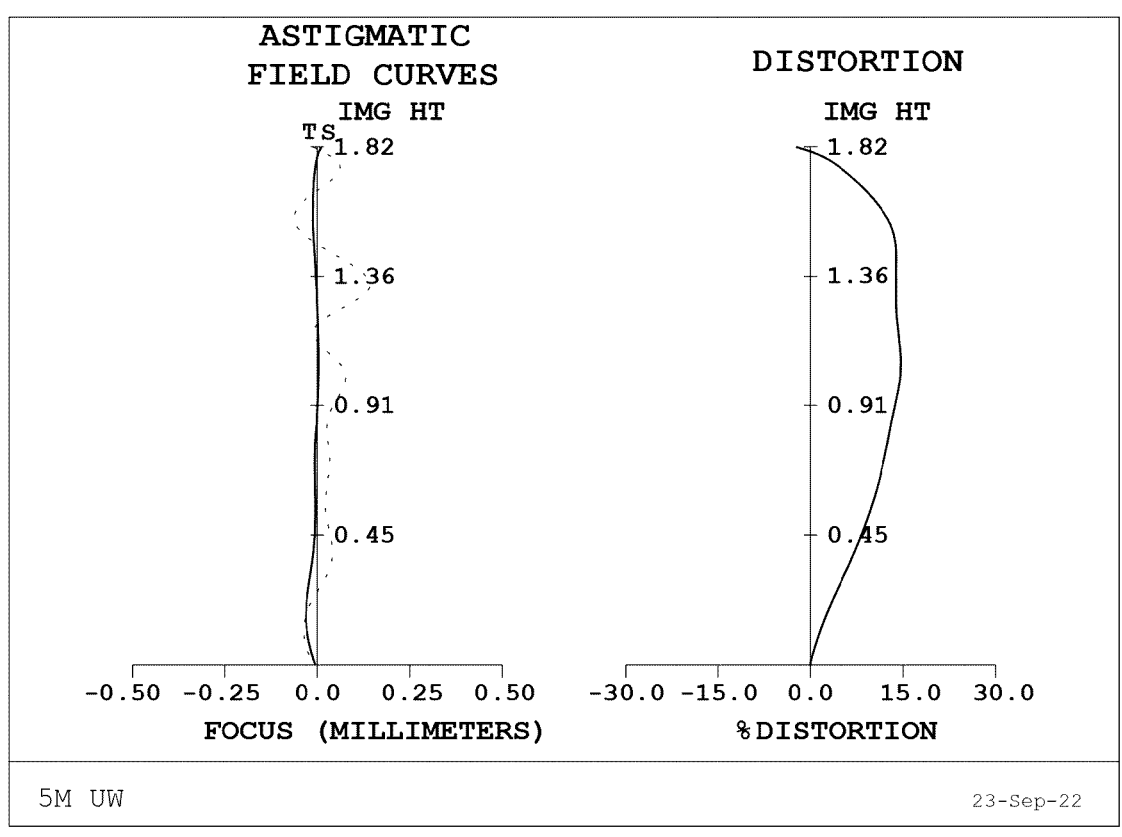
FIG. 6 is an aberration diagram according to the third embodiment of the present disclosure.
Figure 7:
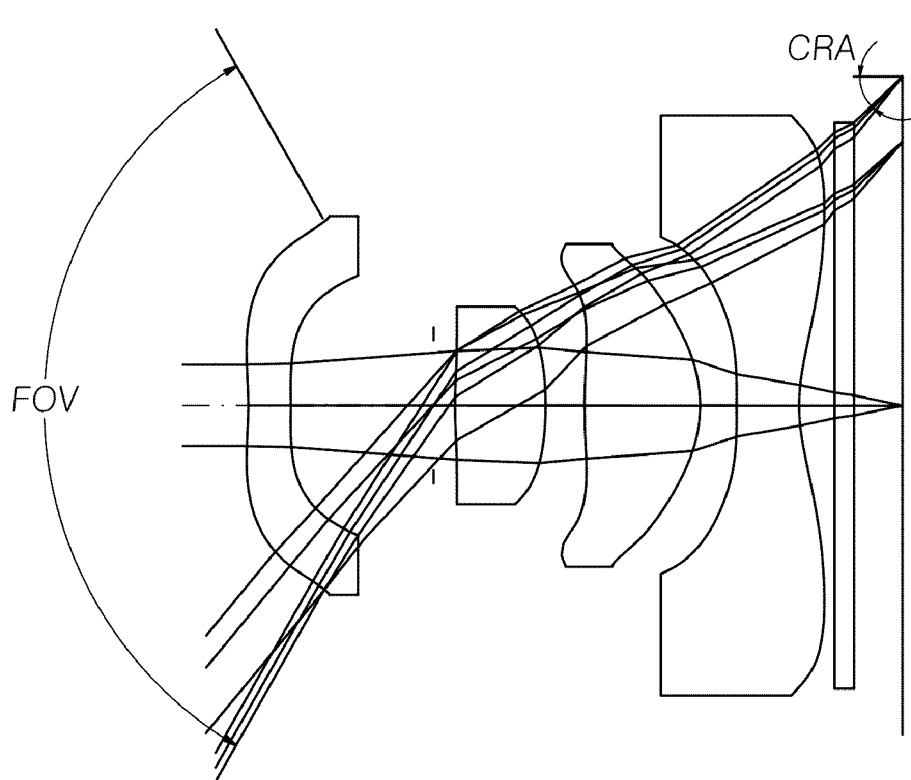
FIG. 7 is a diagram illustrating the definition of the chief ray angle (CRA) and the field of view (FOV).

Hereinafter, the present disclosure will be described in detail with reference to the accompanying drawings. FIG. 1 is a diagram illustrating a first embodiment of a small lens system according to the present disclosure, FIG. 2 is an aberration diagram according to the first embodiment of the present disclosure, FIG. 3 is a diagram illustrating a second embodiment of the small lens system according to the present disclosure, FIG. 4 is an aberration diagram according to the second embodiment of the present disclosure, FIG. 5 is a diagram illustrating a third embodiment of the small lens system according to the present disclosure, FIG. 6 is an aberration diagram according to the third embodiment of the present disclosure, and FIG. 7 is a diagram illustrating the definition of the chief ray angle (CRA) and the field of view (FOV).

As illustrated in the figures, the small lens system according to the present disclosure includes a first lens L1, a second lens L2, a third lens L3, and a fourth lens L4 sequentially arranged along the optical axis from the object side. Here, an iris diaphragm is located between the first lens L1 and the second lens L2. The first lens L1 has a negative refractive power, and has a concave surface on the object side and a convex surface on the image side. The second lens L2 has a positive refractive power, and has convex surfaces on both sides. The third lens L3 has a positive refractive power, and has convex surfaces on both sides. The fourth lens L4 has a negative refractive power, and has concave surfaces on both sides. In the first lens L1 to the fourth lens L4, all surfaces are aspherical.

In the lens system according to the present disclosure, the negative, positive, positive, and negative refractive powers are uniformly distributed in the lenses, the lenses are aspherical lenses, and the shape of each lens is configured to be convex or concave. In this manner, the lenses are configured to be suitable to the lens system that has a reduced tolerance while having a reduced size and weight.

In particular, according to the present disclosure, the lens system corrects the color aberration by distributing negative, positive, positive, and negative refractive powers using a total of four lenses, and minimizes distortion and reduces the sensitivity of tolerance by controlling the curvature and shape by configuring the first lens to have a meniscus shape concave on the object side, each of the second and third lenses to have convex surfaces on both sides, and the fourth lens to have concave surfaces on both sides. Accordingly, the lens system has superior performance and productivity.

In addition, according to an embodiment of the present disclosure, the object side curvature (or radius) R1 and the image side curvature R2 of the first lens L1 and the object side curvature R3 and the image side curvature R4 of the second lens L2 are set to satisfy the relational expressions: $-2<(R1+R2)/(R1-R2)<0$ and $0<(R3+R4)/(R3-R4)<0.5$.

In this manner, the aberration of the first lens L1 having the negative refractive power and the aberration of the second lens L2 having the positive refractive power may be reduced by respectively setting the relationships of the curvatures on the object side and the image side of the first lens L1 and the second lens L2.

In addition, according to an embodiment of the present disclosure, the effective focal length of the entire system, the focal length f1 of the first lens L1, the focal length f2 of the second lens L2, the focal length f3 of the third lens L3, and the focal length f4 of the fourth lens L4 are set to satisfy the relational expression: $(F/f1+F/f2+F/f3+F/f4)<0.55$.

This configuration may reduce sensitivity by distributing the refractive powers to the lenses and reduce the size of the lenses to be suitable to a small lens system.

In addition, according to an embodiment of the present disclosure, the focal length f1 of the first lens L1, the focal length f2 of the second lens L2, and the focal length f4 of the fourth lens L4 are set to satisfy the relational expression: $0<(f1/f2)+(f1/f4)<1$.

This expression indicates the relationship of the refractive powers of the second lens L2 and the fourth lens L4 with respect to the first lens L1. This configuration may reduce the total track length (TTL) while maintaining a sufficient field of view, thereby ensuring that the lenses are suitable to a small and high-performance lens system.

In addition, according to an embodiment of the present disclosure, the refractive power of the first lens L1, the refractive power P2 of the second lens L2, the refractive power P3 of the third lens L3, and the refractive power P4 of the fourth lens L4 are set to satisfy the relational expression: $-1<P1-(P2+P3+P4)<0$.

According to this configuration, the refractive powers may be effectively distributed with respect to the iris diaphragm so as to reduce aberration and be suitable to a small lens system.

In addition, according to an embodiment of the present disclosure, the center thickness L1_CT of the first lens L1, the center thickness L2_CT of the second lens L2, the center thickness L3_CT of the third lens L3, the center thickness L4_CT of the fourth lens L4 are set to satisfy the relational expression: 1.3<(L3_CT+L4_CT)/(L2_CT+L1_CT)<1.6.

In this manner, the relationship of the center thickness among the first to fourth lenses L1 to L4 may be set to be effective to the distribution of the refractive powers and reduce the sensitivity of tolerance so as to be suitable to a small lens system.

In addition, according to an embodiment of the present disclosure, each of the second lens L2 and the third lens L3 is configured to have convex surfaces on both sides, and the center thickness L2_CT of the second lens L2, the outermost thickness L2_ET of the second lens L2, the center thickness L3_CT of the third lens L3, and the outermost thickness L3_ET of the third lens L3 are set to satisfy the relational expression: 1.0<L2_CT/L2_ET<3.0, 1.0<L3_CT/L3_ET<3.0.

In this manner, the relationship of the center thickness of the second lens L2 and the third lens L3 may be set to be effective to the distribution of the refractive powers and reduce the sensitivity of tolerance so as to be suitable to the small lens system. That is, the sensitivity of tolerance and the TTL of the lens system may be reduced by setting the refractive power and the thickness and shape of the lens system according to the present disclosure, thereby providing a small and light lens system.

In addition, according to an embodiment of the present disclosure, the refractive index L1_Nd of the first lens L1 and the refractive index L2_Nd of the second lens L2 are set to satisfy the relational expression: L2_Nd–L1_Nd<0.01.

This configuration is intended to reduce the sensitivity of tolerance by reducing the difference in the refractive index between the first lens L1 and the second lens L2 to be smaller than 0.01, thereby providing a lens system having superior performance and productivity.

In addition, according to an embodiment of the present disclosure, the half field of view (HFOV) and the upward angle CRA of a main ray of the lens system are set to satisfy the relational expression: 1<HFOV/CRA<1.6.

This relational expression indicates the relationship between the HFOV and the upward angle CRA of a main ray, which are intended to obtain optical performance such as high definition and a wide angle. In this manner, the field of view (FOV) of the lens system according to the present disclosure may satisfy the relational expression: 80°<FOV to be suitable to a wide-angle lens system. Thus, the lens system is expected to have excellent usability.

In addition, according to an embodiment of the present disclosure, TTL, i.e., the distance from the first lens surface to the image plane along the optical axis and the image side height ImageH are set to satisfy the relational expression: 2.0<TTL/ImageH<2.5 so as to be suitable to a small lens system.

As described above, even in the case that a total of four lenses are used, a small, high-definition, and wide-angle lens system that may correct distortion while being small and light, is thin due to the short TTL while having a relatively large field of view, or is applicable to a small camera module, in particular, a smartphone may be provided.

In addition, all surfaces of the first lens L1, the second lens L2, the third lens L3, and the fourth lens L4 are aspherical, the lenses are made of a plastic material so as to be able to correct spherical aberration and color aberration, each of the lenses is made of a material, the refractive index of which is advantageous in reducing the length, and a material in which Abbe numbers are appropriately distributed is used to be advantageous in the correction of color aberration.

As described above, the present disclosure relates to the lens system including a total of four lenses, in which the first lens L1, the second lens L2, the third lens L3, and the fourth lens L4 are arranged along the optical axis from an object. Color aberration is corrected by the distribution of the negative, positive, positive, and negative refractive powers. Distortion is minimized and the sensitivity of tolerance is reduced by controlling the curvature and shape by configuring the first lens L1 to have a meniscus shape concave on the object side, each of the second and third lenses L2 and L3 to have convex surfaces on both sides, and the fourth lens L4 to have concave surfaces on both sides. Accordingly, the small lens system has superior performance and productivity.

Hereinafter, embodiments of the present disclosure will be described with reference to the accompanying drawings.

First Embodiment

FIG. 1 is a diagram illustrating a first embodiment of a small lens system according to the present disclosure.

As illustrated in FIG. 1, according to the first embodiment of the present disclosure, the first lens L1, the second lens L2, the third lens L3, and the fourth lens L4 are sequentially arranged along the optical axis from an object, and the iris diaphragm is located between the first lens L1 and the second lens L2.

Table 1 below illustrates numerical data of the lenses of the lens system according to the first embodiment of the present disclosure.

TABLE 1

| Surface No. | Surface Type | Y Radius (of Curvature) | Thickness | Glass Code | Y Semi-Aperture |
|---|---|---|---|---|---|
| Object | Sphere | infinity | 600.0000 | | |
| 1 | Sphere | infinity | 0.0000 | | 1.5186 |
| 2 | Qcon Asphere | −1.8339 | 0.2612 | 535000.5600 | 1.0320 |
| Stop | Qcon Asphere | −73.4505 | 0.7875 | | 0.6942 |
| 4 | Sphere | infinity | 0.0108 | | 0.3587 |
| 5 | Qcon Asphere | 3.9152 | 0.4652 | 544100.5600 | 0.3587 |
| 6 | Qcon Asphere | −1.6021 | 0.2932 | | 0.5429 |
| 7 | Qcon Asphere | 2.7847 | 0.6694 | 535000.5600 | 0.6000 |
| 8 | Qcon Asphere | −0.9890 | 0.0995 | | 0.7688 |
| 9 | Qcon Asphere | −57.0000 | 0.4500 | 670000.1950 | 0.7986 |
| 10 | Qcon Asphere | 1.0053 | 0.2000 | | 1.2250 |
| 11 | Sphere | infinity | 0.1100 | BSC7_HOYA | 1.4085 |
| 12 | Sphere | infinity | 0.5244 | | 1.4525 |
| Image | Sphere | infinity | 0.0000 | | 1.8150 |

As illustrated in FIG. 1, the first lens L1, the second lens L2, the third lens L3, and the fourth lens L4 are arranged from the object side, and the Qcon polynomial of each lens according to the Qcon aspherical surface meets the following Equation 1.

$$Z = \frac{cr^2}{1 + \sqrt{1 - (1+k)c^2 r^2}} + u^4 \sum_{m=0}^{13} a_m Q_m^{con}(u^2) \qquad \text{[Equation 1]}$$

Here, Z indicates the sag of a surface parallel to the z axis in the lens system, c indicates the vertex curvature of the lens, k indicates the conic constant, r indicates the radial distance of the lens, $r_n$ indicates the normalization radius, u indicates $r/r_n$, $a_m$ indicates the mth Qcon coefficient, and $Qm^{con}$ indicates the mth Qcon polynomial.

The Qcon coefficient from Equation 1 is illustrated in Table 2.

thickness L3_CT of the third lens, and the center thickness L4_CT of the fourth lens satisfy the equations: L1_CT=0.2612, L2_CT=0.4652, L3_CT=0.6694, and L4_CT=0.4500, respectively, and satisfy the equations: (L3_CT+L4_CT)/(L2_CT+L1_CT)=1.5410 and (L1_CT+L3_CT+L4_CT)/L2_CT=2.9677.

In addition, the refractive index L1_Nd=1.5350 of the first lens and the refractive index L2_Nd=1.5440 of the second

TABLE 2

| Surface | 2 | 3 | 5 | 6 |
|---|---|---|---|---|
| Y Radius | −1.83389.E+00 | −7.34505.E+01 | 3.91515.E+00 | −1.60211.E+00 |
| Nomalization Radius | 1.02990.E+00 | 7.52620.E−01 | 3.78623.E−01 | 5.78012.E−01 |
| Conic Constant | −6.12539.E+01 | −9.90000.E+01 | 0.00000.E+00 | 5.04302.E+00 |
| 4th Qcon Coefficient | 4.54425.E−01 | 4.29623.E−01 | −1.43574.E−02 | −9.39798.E−02 |
| 6th Qcon Coefficient | −2.46021.E−02 | −1.19297.E−02 | 1.32339.E−04 | −1.18275.E−02 |
| 8th Qcon Coefficient | 4.92530.E−03 | −6.03095.E−03 | 1.51395.E−03 | −1.49756.E−03 |
| 10th Qcon Coefficient | −3.12774.E−03 | −1.00876.E−02 | 1.74260.E−03 | 5.25203.E−04 |
| 12th Qcon Coefficient | −8.81891.E−04 | −2.70803.E−03 | 1.75229.E−03 | 1.34737.E−03 |
| 14th Qcon Coefficient | −2.27246.E−04 | −4.16243.E−04 | 1.62452.E−03 | 1.20976.E−03 |
| 16th Qcon Coefficient | −1.06579.E−04 | 5.36903.E−04 | 1.42743.E−03 | 9.84817.E−04 |
| 18th Qcon Coefficient | 4.13651.E−05 | 1.09916.E−04 | 1.15156.E−03 | 6.08296.E−04 |
| 20th Qcon Coefficient | 2.41281.E−05 | −6.08913.E−05 | 8.88396.E−04 | 3.07192.E−04 |
| 22nd Qcon Coefficient | −9.97643.E−06 | −1.86327.E−04 | 6.41665.E−04 | 5.23922.E−05 |
| 24th Qcon Coefficient | 9.55970.E−06 | −7.86359.E−05 | 4.30367.E−04 | −3.46800.E−05 |
| 26th Qcon Coefficient | 6.36393.E−06 | −3.02836.E−05 | 2.58286.E−04 | −6.72227.E−05 |
| 28th Qcon Coefficient | 2.19818.E−05 | 1.07760.E−05 | 1.34892.E−04 | −5.26947.E−05 |
| 30th Qcon Coefficient | −1.02537.E−05 | −2.79385.E−06 | 5.37545.E−05 | −2.56860.E−05 |

| Surface | 7 | 8 | 9 |
|---|---|---|---|
| Y Radius | 2.78468.E+00 | −9.89010.E−01 | −5.70000.E+01 |
| Nomalization Radius | 9.41516.E−01 | 1.06404.E+00 | 1.39086.E+00 |
| Conic Constant | −7.30494.E+01 | −8.59234.E−01 | −2.46682.E+01 |
| 4th Qcon Coefficient | −2.22666.E−01 | 3.55429.E−02 | −2.08372.E+00 |
| 6th Qcon Coefficient | 3.53914.E−02 | 1.40743.E−01 | 3.66158.E−01 |
| 8th Qcon Coefficient | 3.88216.E−02 | 7.13469.E−02 | 9.47861.E−02 |
| 10th Qcon Coefficient | −2.05957.E−02 | −2.26173.E−02 | 6.81499.E−02 |
| 12th Qcon Coefficient | −1.45854.E−02 | −3.54422.E−02 | −1.19637.E−02 |
| 14th Qcon Coefficient | 2.13048.E−03 | −1.07060.E−03 | −2.18711.E−03 |
| 16th Qcon Coefficient | 4.67920.E−03 | 9.65860.E−03 | 1.35551.E−03 |
| 18th Qcon Coefficient | 5.90917.E−04 | 4.31083.E−03 | −7.33096.E−03 |
| 20th Qcon Coefficient | 3.62561.E−04 | −6.01978.E−03 | −6.41290.E−03 |
| 22nd Qcon Coefficient | 1.53779.E−03 | −6.20865.E−03 | 8.58941.E−03 |
| 24th Qcon Coefficient | 1.07334.E−03 | −2.07842.E−03 | 8.17122.E−03 |
| 26th Qcon Coefficient | −2.29135.E−04 | 1.28899.E−03 | 5.04453.E−03 |
| 28th Qcon Coefficient | −5.74697.E−04 | 1.07101.E−03 | 3.83911.E−03 |
| 30th Qcon Coefficient | −2.35985.E−04 | 3.54912.E−04 | 2.10653.E−03 |

According to the first embodiment of the present disclosure, the object side curvature (or radius) R1 and the image side curvature R2 of the first lens satisfy the equation: (R1+R2)/(R1−R2)=−1.05, while the object side curvature R3 and the image side curvature R4 of the second lens satisfy the equation: (R3+R4)/(R3−R4)=0.42.

In addition, the effective focal length F and the black focal length (BFL) of the entire system are 1.42 mm and 0.52 mm, respectively. The focal length f1 of the first lens, the focal length f2 of the second lens, the focal length f3 of the third lens, the focal length f4 of the fourth lens satisfy the equations: f1=−3.43 mm, f2=2.17 mm, f3=1.47 mm, and f4=−1.82 mm. The equations: F/f1=−0.41, F/f2=0.65, F/f3=0.97, F/f4=−0.78, and F/f1+F/f2+F/f3+F/f4=0.43 are satisfied, and the equations: F/f1=−0.41, F/f2=0.65, F/f3=0.97, F/f4=−0.78, F/f1+F/f2+F/f3+F/f4=0.43 are satisfied. Here, F number satisfies the equation: $f_{no}$=2.28.

In addition, the center thickness L2_CT and the outermost thickness L2_ET of the second lens and the center thickness L3_CT and the outermost thickness L3_ET of the third lens satisfy the equations: L2_CT/L2_ET=1.23 and L3_CT/L3_ET=2.20. The center thickness L1_CT of the first lens, the center thickness L2_CT of the second lens, the center lens satisfy the equation: L2_Nd−L1_Nd=0.009, while the refractive power P1 of the first lens, the refractive power P2 of the second lens, the refractive power P3 of the third lens, the refractive power P4 of the fourth lens satisfy the equations: P1=−0.29, P2=0.47, P3=0.69, P4=−0.69, P1−(P2+P3+P4)=−0.76, and P1+P2−(P3+P4)=0.18.

In addition, the distance TTL=3.89 mm to the image side from the center and the image side height Image H of the first lens L1 satisfy the equation: TTL/Image H=2.14, while the HFOV of the lens system and the image side angle CRA of a main ray satisfy the equations: FOV=91.7°, tan (HFOV)= 1.28, HFOV=56.1°, CRA=36.1°, and HFOV/CRA=1.55.

FIG. 2 is an aberration diagram according to the first embodiment of the present disclosure.

The first data in FIG. 2 indicates astigmatism, in which the horizontal axis indicates the focus (mm), the vertical axis indicates the image height (mm), graph S indicates sagittal, i.e., a light ray incident in parallel to the lens, and graph T indicates tangential, i.e., a light ray incident perpendicular to the lens. Here, it is known that the closer the graphs S and T and the closer to the central vertical axis, the higher the ability of correction is. The astigmatism according to the first embodiment of the present disclosure is determined to be 0.025 mm (focus), which is satisfactory.

The second data in FIG. 2 indicates distortion aberration, in which the horizontal axis indicates the degree of distortion (%), and the vertical axis indicates the image height (mm). It is generally known that an aberration curve in the range of −2 to 2% is satisfactory. Due to the distortion aberration according to the first embodiment of the present disclosure, the optical distortion is determined to be 2% or lower, which is satisfactory.

Second Embodiment

FIG. 3 is a diagram illustrating a second embodiment of the small lens system according to the present disclosure.

As illustrated in FIG. 3, according to the second embodiment of the present disclosure, the first lens L1, the second lens L2, the third lens L3, and the fourth lens L4 are sequentially arranged along the optical axis from an optical axis, and iris diaphragm is located between the first lens L1 and the second lens L2.

Table 3 below illustrates numerical data of the lenses of the lens system according to the second embodiment of the present disclosure.

TABLE 3

| Surface No. | Surface Type | Y Radius (of Curvature) | Thickness | Glass Code | Y Semi-Aperture |
|---|---|---|---|---|---|
| Object | Sphere | infinity | 600.0000 | | |
| 1 | Sphere | infinity | 0.0000 | | 1.6715 |
| 2 | Qcon Asphere | −1.8781 | 0.2674 | 535000.5600 | 1.2000 |

TABLE 3-continued

| Surface No. | Surface Type | Y Radius (of Curvature) | Thickness | Glass Code | Y Semi-Aperture |
|---|---|---|---|---|---|
| Stop | Qcon Asphere | −13.4040 | 0.8035 | | 0.8000 |
| 4 | Sphere | infinity | 0.1000 | | 0.2748 |
| 5 | Qcon Asphere | 3.4665 | 0.4649 | 544100.5600 | 0.3587 |
| 6 | Qcon Asphere | −1.6390 | 0.2925 | | 0.5342 |
| 7 | Qcon Asphere | 2.3657 | 0.6432 | 535000.5600 | 0.7140 |
| 8 | Qcon Asphere | −0.8392 | 0.1000 | | 0.8310 |
| 9 | Qcon Asphere | −52.0000 | 0.4352 | 670000.1950 | 0.8526 |
| 10 | Qcon Asphere | 1.2834 | 0.2000 | | 1.4289 |
| 11 | Sphere | infinity | 0.1100 | BSC7_HOYA | 1.5646 |
| 12 | Sphere | infinity | 0.2040 | | 1.6207 |
| Image | Sphere | infinity | 0.0000 | | 1.8150 |

As illustrated in FIG. 3, the first lens L1, the second lens L2, the third lens L3, and the fourth lens L4 are arranged from the object side. When the direction of the optical axis is set to be X and a direction perpendicular to the optical axis is set to be Y, an aspherical equation is the same as Equation 1 above.

An aspherical surface is a curved surface obtained by rotating a curve obtained from the aspherical equation of Equation 1 about the optical axis, in which R indicates a radius of curvature, K indicates a conic constant, $A_3$, $A_4$, $A_5$, $A_6$, . . . , and $A_{14}$ are aspherical coefficients.

The aspherical coefficients having the data of respective lenses obtained from Equation 1 are illustrated in Table 4.

TABLE 4

| Surface | 2 | 3 | 5 | 6 |
|---|---|---|---|---|
| Y Radius | −1.87814.E+00 | −1.34040.E+01 | 3.46655.E+00 | −1.63903.E+00 |
| Nomalization Radius | 1.02990.E+00 | 7.52620.E−01 | 3.78623.E−01 | 5.78012.E−01 |
| Conic Constant | −2.27868.E+02 | 7.71431.E+01 | 0.00000.E+00 | 5.86127.E+00 |
| 4th Qcon Coefficient | 5.27889.E−01 | 3.90664.E−01 | −1.53522.E−02 | −9.40055.E−02 |
| 6th Qcon Coefficient | −4.96421.E−03 | −8.75167.E−03 | 9.13699.E−04 | −1.10105.E−02 |
| 8th Qcon Coefficient | −1.38347.E−04 | 4.28579.E−03 | 2.24795.E−03 | −1.55710.E−03 |
| 10th Qcon Coefficient | −9.65045.E−03 | −6.55278.E−03 | 2.46931.E−03 | 7.42111.E−04 |
| 12th Qcon Coefficient | −6.47083.E−03 | −2.04735.E−03 | 2.19967.E−03 | 1.36561.E−03 |
| 14th Qcon Coefficient | −1.47609.E−03 | −7.52452.E−04 | 1.83763.E−03 | 1.12550.E−03 |
| 16th Qcon Coefficient | −8.37481.E−04 | −9.07306.E−05 | 1.38611.E−03 | 9.07083.E−04 |
| 18th Qcon Coefficient | 9.81052.E−04 | 3.62864.E−04 | 9.70723.E−04 | 4.67950.E−04 |
| 20th Qcon Coefficient | 2.31183.E−04 | 7.01613.E−05 | 6.09576.E−04 | 2.59560.E−04 |
| 22nd Qcon Coefficient | 5.32543.E−04 | 1.59068.E−04 | 3.43096.E−04 | 3.69742.E−05 |
| 24th Qcon Coefficient | −4.05511.E−05 | −4.44835.E−05 | 1.63843.E−04 | −1.34733.E−06 |
| 26th Qcon Coefficient | 2.03062.E−05 | 7.20459.E−06 | 6.11907.E−05 | −5.11754.E−05 |
| 28th Qcon Coefficient | −1.11505.E−04 | −5.33428.E−05 | 1.66600.E−05 | −1.70850.E−05 |
| 30th Qcon Coefficient | −3.12059.E−05 | 1.87498.E−05 | 3.19036.E−06 | −1.53421.E−05 |

| Surface | 7 | 8 | 9 |
|---|---|---|---|
| Y Radius | 2.36569.E+00 | −8.39238.E−01 | −5.20000.E+01 |
| Nomalization Radius | 9.41516.E−01 | 1.06404.E+00 | 1.39086.E+00 |
| Conic Constant | −2.27572.E+02 | −9.75999.E−01 | 9.90000.E+01 |
| 4th Qcon Coefficient | −2.08581.E−01 | 5.56521.E−02 | −2.20460.E+00 |
| 6th Qcon Coefficient | 3.93392.E−02 | 1.14592.E−01 | 4.34109.E−01 |
| 8th Qcon Coefficient | 2.89246.E−02 | 4.49322.E−02 | 1.85083.E−01 |
| 10th Qcon Coefficient | −2.05844.E−02 | −3.36240.E−03 | 6.99158.E−03 |
| 12th Qcon Coefficient | −1.45839.E−02 | −4.68987.E−02 | −1.88291.E−02 |
| 14th Qcon Coefficient | 2.12616.E−03 | −1.05650.E−03 | 5.26328.E−02 |
| 16th Qcon Coefficient | 4.68018.E−03 | 7.53908.E−03 | 6.12382.E−03 |
| 18th Qcon Coefficient | 5.93018.E−04 | 4.30524.E−03 | −7.34488.E−03 |
| 20th Qcon Coefficient | 3.61229.E−04 | −6.02353.E−03 | −6.39048.E−03 |
| 22nd Qcon Coefficient | 1.53674.E−03 | −6.20564.E−03 | 8.58325.E−03 |
| 24th Qcon Coefficient | 1.07478.E−03 | −2.07510.E−03 | 8.16497.E−03 |

TABLE 4-continued

| 26th Qcon Coefficient | −2.28875.E−04 | 1.28647.E−03 | 5.05087.E−03 |
| 28th Qcon Coefficient | −5.76021.E−04 | 1.06889.E−03 | 3.83876.E−03 |
| 30th Qcon Coefficient | −2.35704.E−04 | 3.56661.E−04 | 2.10324.E−03 |

According to second embodiment of the present disclosure, the object side curvature R1 and the image side curvature R2 of the first lens L1 satisfy the equation: (R1+R2)/(R1−R2)=−1.33, while the object side curvature R3 and the image side curvature R4 of the second lens satisfy the equation: (R3+R4)/(R3−R4)=0.36.

In addition, the effective focal length F and the BFL of the entire system are 1.03 mm and 0.20 mm, respectively. The focal length f1 of the first lens, the focal length f2 of the second lens, the focal length f3 of the third lens, the focal length f4 of the fourth lens satisfy the equations: f1=−4.09 mm, f2=2.10 mm, f3=1.24 mm, and f4=−1.84 mm. The equations: F/f1=−0.25, F/f2=0.49, F/f3=0.83, F/f4=−0.56, and F/f1+F/f2+F/f3+F/f4=0.51 are satisfied, and the equations: f1/f2=−1.95, f1/f3=−3.30, f1/f4=2.22 and (f1/f2)+(f1/f4)=0.28 are satisfied. Here, F number satisfies the equation: $f_{no}$=2.28.

In addition, the center thickness L2_CT and the outermost thickness L2_ET of the second lens and the center thickness L3_CT and the outermost thickness L3_ET of the third lens satisfy the equations: L2_CT/L2_ET=1.69 and L3_CT/L3_ET=2.67. The center thickness L1_CT of the first lens, the center thickness L2_CT of the second lens, the center thickness L3_CT of the third lens, and the center thickness L4_CT of the fourth lens satisfy the equations: L1_CT=0.2674, L2_CT=0.4649, L3_CT=0.6432, and L4_CT=0.4352, respectively, and satisfy the equations: (L3_CT+L4_CT)/(L2_CT+L1_CT)=1.4726 and L1_CT+L3_CT+L4_CT)/L2_CT=2.8948.

In addition, the refractive index L1_Nd=1.5350 of the first lens and the refractive index L2_Nd=1.5440 of the second lens satisfy the equation: L2_Nd−L1_Nd=0.009, while the refractive power P1 of the first lens, the refractive power P2 of the second lens, the refractive power P3 of the third lens, the refractive power P4 of the fourth lens satisfy the equations: P1=−0.24, P2=0.48, P3=−0.80, P4=−0.54, P1−(P2+P3+P4)=−0.98, and P1+P2−(P3+P4)=−0.03.

In addition, the distance 3.62 mm to the image side from the center and the image side height Image H of the first lens L1 satisfy the equation: TTL/Image H=2.14, while the HFOV of the lens system and the image side angle CRA of a main ray satisfy the equations: FOV=109.8°, tan (HFOV)=1.76, HFOV=54.91°, CRA=47.6°, and HFOV/CRA=1.15.

FIG. 4 is an aberration diagram according to the second embodiment of the present disclosure.

The first data in FIG. 4 indicates astigmatism, in which the horizontal axis indicates the focus (mm), the vertical axis indicates the image height (mm), graph S indicates sagittal, i.e., a light ray incident in parallel to the lens, and graph T indicates tangential, i.e., a light ray incident perpendicular to the lens. Here, it is known that the closer the graphs S and T and the closer to the central vertical axis, the higher the ability of correction is. The astigmatism according to the second embodiment of the present disclosure is determined to be 0.025 mm (focus), which is satisfactory.

The second data in FIG. 4 indicates distortion aberration, in which the horizontal axis indicates the degree of distortion (%), and the vertical axis indicates the image height (mm). It is generally known that an aberration curve in the range of −2 to 2% is satisfactory. Due to the distortion aberration according to the second embodiment of the present disclosure, the optical distortion is determined to be 2% or lower, which is satisfactory.

Third Embodiment

FIG. 5 is a diagram illustrating a third embodiment of the small lens system according to the present disclosure.

As illustrated in FIG. 5, according to the third embodiment of the present disclosure, the first lens L1, the second lens L2, the third lens L3, and the fourth lens L4 are arranged from the object side, and the Qcon polynomial of each lens according to the Qcon aspherical surface meets the following Equation 1.

Table 5 below illustrates numerical data of the lenses of the lens system according to the third embodiment of the present disclosure.

TABLE 5

| Surface No. | Surface Type | Y Radius (of Curvature) | Thickness | Glass Code | Y Semi-Aperture |
|---|---|---|---|---|---|
| Object | Sphere | infinity | 600.0000 | | |
| 1 | Sphere | infinity | 0.0000 | | 1.7558 |
| 2 | Qcon Asphere | −1.3211 | 0.2398 | 535000.5600 | 1.0333 |
| Stop | Qcon Asphere | −5.6136 | 0.8037 | | 0.7172 |
| 4 | Sphere | infinity | 0.1206 | | 0.3587 |
| 5 | Qcon Asphere | 3.0057 | 0.5100 | 544100.5600 | 0.3000 |
| 6 | Qcon Asphere | −1.8272 | 0.2194 | | 0.5429 |
| 7 | Qcon Asphere | 2.8627 | 0.6500 | 535000.5600 | 0.6631 |
| 8 | Qcon Asphere | −0.8069 | 0.2129 | | 0.8114 |
| 9 | Qcon Asphere | −77.6159 | 0.3443 | 670000.1950 | 0.8852 |
| 10 | Qcon Asphere | 0.9942 | 0.2000 | | 1.4094 |
| 11 | Sphere | infinity | 0.1100 | BSC7__HOYA | 1.5061 |
| 12 | Sphere | infinity | 0.2719 | | 1.5610 |
| Image | Sphere | infinity | 0.0000 | | 1.8150 |

As illustrated in FIG. 5, the first lens L1, the second lens L2, the third lens L3, and the fourth lens L4 are arranged from the object side. When the direction of the optical axis is set to be X and a direction perpendicular to the optical axis is set to be Y, an aspherical equation is the same as Equation 1 above.

An aspherical surface is a curved surface obtained by rotating a curve obtained from the aspherical equation of Equation 1 about the optical axis, in which R indicates a radius of curvature, K indicates a conic constant, $A_3, A_4, A_5, A_6, \ldots,$ and $A_{14}$ are aspherical coefficients.

The aspherical coefficients having the data of respective lenses obtained from Equation 1 are illustrated in Table 6.

TABLE 6

| Surface | 2 | 3 | 5 | 6 |
|---|---|---|---|---|
| Y Radius | −1.32114.E+00 | −5.61360.E+00 | 3.00567.E+00 | −1.82717.E+00 |
| Nomalization Radius | 1.02990.E+00 | 7.52620.E−01 | 3.78623.E−01 | 5.78012.E−01 |
| Conic Constant | −1.06519.E+02 | −4.42423.E+03 | 0.00000.E+00 | 5.05156.E+00 |
| 4th Qcon Coefficient | 5.16184.E−01 | 4.61682.E−01 | −1.36668.E−02 | −9.40329.E−02 |
| 6th Qcon Coefficient | −1.50233.E−02 | 6.14077.E−04 | 8.84301.E−04 | −9.59935.E−03 |
| 8th Qcon Coefficient | 6.71647.E−03 | 3.50347.E−03 | 1.49038.E−03 | −2.40115.E−03 |
| 10th Qcon Coefficient | −2.43219.E−03 | −9.29309.E−03 | 2.10294.E−03 | 5.48469.E−04 |
| 12th Qcon Coefficient | −2.59302.E−03 | −4.76573.E−03 | 1.85654.E−03 | 9.87670.E−04 |
| 14th Qcon Coefficient | −2.36598.E−04 | −2.15567.E−03 | 1.73865.E−03 | 1.21290.E−03 |
| 16th Qcon Coefficient | −1.08679.E−03 | −4.07240.E−04 | 1.39934.E−03 | 1.01266.E−03 |
| 18th Qcon Coefficient | 3.38847.E−04 | 5.58804.E−04 | 1.10934.E−03 | 6.83623.E−04 |
| 20th Qcon Coefficient | −1.97325.E−04 | 4.61684.E−04 | 7.93385.E−04 | 4.03226.E−04 |
| 22nd Qcon Coefficient | 1.74350.E−04 | 3.01040.E−04 | 5.48722.E−04 | 1.16546.E−04 |
| 24th Qcon Coefficient | −9.64233.E−05 | 9.19065.E−06 | 3.31814.E−04 | −3.68467.E−05 |
| 26th Qcon Coefficient | 8.35405.E−05 | 6.73507.E−05 | 1.87353.E−04 | −1.08844.E−04 |
| 28th Qcon Coefficient | −1.54580.E−04 | −4.90661.E−05 | 7.95026.E−05 | −8.42906.E−05 |
| 30th Qcon Coefficient | 4.77937.E−05 | 1.92527.E−05 | 2.44175.E−05 | −2.94734.E−05 |

| Surface | 7 | 8 | 9 |
|---|---|---|---|
| Y Radius | 2.86268.E+00 | −8.06884.E−01 | −7.76159.E+01 |
| Nomalization Radius | 9.41516.E−01 | 1.06404.E+00 | 1.39086.E+00 |
| Conic Constant | −3.72351.E+02 | −1.21171.E+00 | −1.26984.E+13 |
| 4th Qcon Coefficient | −2.21986.E−01 | 1.21759.E−01 | −2.04993.E+00 |
| 6th Qcon Coefficient | 8.20596.E−02 | 1.46774.E−01 | 2.46176.E−01 |
| 8th Qcon Coefficient | 4.03795.E−02 | 4.92863.E−02 | 1.84568.E−01 |
| 10th Qcon Coefficient | −2.05679.E−02 | −1.21442.E−02 | 6.68249.E−02 |
| 12th Qcon Coefficient | −1.45807.E−02 | −3.44191.E−02 | −4.28962.E−02 |
| 14th Qcon Coefficient | 2.12038.E−03 | −1.04616.E−03 | 2.77764.E−02 |
| 16th Qcon Coefficient | 4.68118.E−03 | 9.67335.E−03 | 1.65822.E−02 |
| 18th Qcon Coefficient | 5.94729.E−04 | 4.30228.E−03 | −7.36347.E−03 |
| 20th Qcon Coefficient | 3.60370.E−04 | −6.02788.E−03 | −6.38882.E−03 |
| 22nd Qcon Coefficient | 1.53645.E−03 | −6.20545.E−03 | 8.58859.E−03 |
| 24th Qcon Coefficient | 1.07461.E−03 | −2.07253.E−03 | 8.16287.E−03 |
| 26th Qcon Coefficient | −2.28261.E−04 | 1.28695.E−03 | 5.04852.E−03 |
| 28th Qcon Coefficient | −5.75937.E−04 | 1.06758.E−03 | 3.84051.E−03 |
| 30th Qcon Coefficient | −2.36292.E−04 | 3.55325.E−04 | 2.10433.E−03 |

According to third embodiment of the present disclosure, the object side curvature R1 and the image side curvature R2 of the first lens L1 satisfy the equation: (R1+R2)/(R1−R2)=−1.62, while the object side curvature R3 and the image side curvature R4 of the second lens satisfy the equation: (R3+R4)/(R3−R4)=0.24.

In addition, the effective focal length F and the BFL of the entire system are 1.07 mm and 0.27 mm, respectively. The focal length f1 of the first lens, the focal length f2 of the second lens, the focal length f3 of the third lens, the focal length f4 of the fourth lens satisfy the equations: f1=−3.28 mm, f2=2.16 mm, f3=1.25 mm, and f4=−1.44 mm. The equations: F/f1=−0.33, f/f2=0.5, F/f3=0.86, F/f4=−0.74, and F/f1+F/f2+F/f3+F/f4=0.29 are satisfied, and the equations: f1/f2=−1.52, f1/f3=−2.62, f1/f4=2.28, and (f1/f2)+(f1/f4)= 0.76 are satisfied. Here, F number satisfies the equation: $f_{no}$=2.28.

In addition, the center thickness L2_CT and the outermost thickness L2_ET of the second lens and the center thickness L3_CT and the outermost thickness L3_ET of the third lens satisfy the equations: L2_CT/L2_ET=1.44 and L3_CT/L3_ET=2.30. The center thickness L2_CT and the outermost thickness L2_ET of the second lens and the center thickness L3_CT and the outermost thickness L3_ET of the third lens satisfy the equations: L2_CT/L2_ET=1.44 and L3_CT/L3_ET=2.30. The center thickness L1_CT of the first lens, the center thickness L2_CT of the second lens, the center thickness L3_CT of the third lens, and the center thickness L4_CT of the fourth lens satisfy the equations: L1_CT=0.2398, L2_CT=0.5100, L3_CT=0.6500 and L4_CT=0.3443, respectively, and satisfy the equations: (L1_CT+L3_CT+L4_CT)/L2_CT=2.4200.

In addition, the refractive index L1_Nd=1.5350 of the first lens and the refractive index L2_Nd=1.5440 of the second lens satisfy the equation: L2_Nd−L1_Nd=0.009, while the refractive power P1 of the first lens, the refractive power P2 of the second lens, the refractive power P3 of the third lens, the refractive power P4 of the fourth lens satisfy the equations: P1=−0.30, P2−0.46, P3=0.80, P4=−0.69, P1−(P2+P3+P4)=−0.87, and P1+P2−(P3+P4)=0.05.

In addition, the distance 3.68 mm to the image side from the center and the image side height Image H of the first lens L1 satisfy the equation: TTL/Image H=2.03, while the HFOV of the lens system and the image side angle CRA of a main ray satisfy the equations: FOV=119.9°, tan (HFOV)= 1.69, HFOV=59.95°, CRA=46.2°, and HFOV/CRA=1.30.

FIG. 6 is an aberration diagram according to the third embodiment of the present disclosure.

The first data in FIG. 6 indicates astigmatism, in which the horizontal axis indicates the focus (mm), the vertical axis indicates the image height (mm), graph S indicates sagittal, i.e., a light ray incident in parallel to the lens, and graph T indicates tangential, i.e., a light ray incident perpendicular to the lens. Here, it is known that the closer the graphs S and T and the closer to the central vertical axis, the higher the ability of correction is. The astigmatism according to the third embodiment of the present disclosure is determined to be 0.025 mm (focus), which is satisfactory.

The second data in FIG. 6 indicates distortion aberration, in which the horizontal axis indicates the degree of distortion (%), and the vertical axis indicates the image height (mm). It is generally known that an aberration curve in the range of −2 to 2% is satisfactory. Due to the distortion aberration according to the third embodiment of the present disclosure, the optical distortion is determined to be 2% or lower, which is satisfactory.

What is claimed is:

1. A small lens system comprising a first lens, a second lens, a third lens, and a fourth lens arranged along an optical axis from an object, wherein an iris diaphragm is located between the first lens and the second lens, the first lens has a negative refractive power and comprises a concave surface on an object side and a convex surface on an image side, the second lens has a positive refractive power and comprises convex surfaces on both sides, the third lens has a positive refractive power and comprises convex surfaces on both sides, the fourth lens has a negative refractive power and comprises concave surfaces on both sides, and all surfaces of the first to fourth lenses are aspherical, wherein (i) a focal length f1 of the first lens, a focal length f2 of the second lens, a focal length f4 of the fourth lens satisfy $0 < (f1/f2) + (f1/f4) < 1$ and/or (ii) a center thickness L1_CT of the first lens, a center thickness L2_CT of the second lens, a center thickness L3_CT of the third lens, and a center thickness L4_CT of the fourth lens satisfy $1.3 < (L3\_CT + L4\_CT)/(L2\_CT + L1\_CT) < 1.6$.

2. The small lens system of claim 1, wherein an object side curvature R1 and an image side curvature R2 of the first lens and an object side curvature R3 and an image side curvature R4 of the second lens satisfy $-2 < (R1+R2)/(R1-R2) < 0$ and $0 < (R3+R4)/(R3-R4) < 0.5$.

3. The small lens system of claim 1, wherein an effective focal length F of the entire system, a focal length f1 of the first lens, a focal length f2 of the second lens, a focal length f3 of the third lens, a focal length f4 of the fourth lens satisfy $F/f1 + F/f2 + F/f3 + F/f4 < 0.55$.

4. The small lens system of claim 1, wherein a focal length f1 of the first lens, a focal length f2 of the second lens, a focal length f4 of the fourth lens satisfy $0 < (f1/f2) + (f1/f4) < 1$.

5. The small lens system of claim 1, wherein a refractive power P1 of the first lens, a refractive power P2 of the second lens, a refractive power P3 of the third lens, a refractive power P4 of the fourth lens satisfy $-1 < P1 - (P2 + P3 + P4) < 0$.

6. The small lens system of claim 1, wherein a center thickness L1_CT of the first lens, a center thickness L2_CT of the second lens, a center thickness L3_CT of the third lens, and a center thickness L4_CT of the fourth lens satisfy $1.3 < (L3\_CT + L4\_CT)/(L2\_CT + L1\_CT) < 1.6$.

7. The small lens system of claim 1, wherein each of the second lens and the third lens is configured to have convex surfaces on both sides, and a center thickness L2_CT and an outermost thickness L2_ET of the second lens and a center thickness L3_CT and an outermost thickness L3_ET of the third lens satisfy $0 < L2\_CT/L2\_ET < 3.0$ and $1.0 < L3\_CT/L3\_ET < 3.0$, respectively.

8. The small lens system of claim 1, wherein a refractive index L1_Nd of the first lens and a refractive index L2_Nd of the second lens satisfy $L2\_Nd - L1\_Nd < 0.01$.

9. The small lens system of claim 1, wherein a half field of view HFOV and an upward angle CRA of a main ray of the lens system are set to satisfy $1 < HFOV/CRA < 1.6$.

10. The small lens system of claim 1, wherein a total track length TTL and an image side height ImageH are set to satisfy $2.0 < TTL/ImageH < 2.5$.

11. The small lens system of claim 4, wherein a center thickness L1_CT of the first lens, a center thickness L2_CT of the second lens, a center thickness L3_CT of the third lens, and a center thickness L4_CT of the fourth lens satisfy $1.3 < (L3\_CT + L4\_CT)/(L2\_CT + L1\_CT) < 1.6$.

* * * * *